(12) United States Patent
Perchak

(10) Patent No.: US 6,628,405 B1
(45) Date of Patent: Sep. 30, 2003

(54) OPTICAL ANGLE FINDER AND COAXIAL ALIGNMENT DEVICE

(75) Inventor: Robert M. Perchak, Dayton, OH (US)

(73) Assignee: Mirage Development, Ltd., Dayton, OH (US)

( * ) Notice: Subject to any disclaimer, the term of this patent is extended or adjusted under 35 U.S.C. 154(b) by 0 days.

(21) Appl. No.: 09/494,947

(22) Filed: Feb. 1, 2000

Related U.S. Application Data
(60) Provisional application No. 60/118,061, filed on Feb. 1, 1999.

(51) Int. Cl.[7] .................................................. G01B 9/02
(52) U.S. Cl. ....................................... 356/506; 356/154
(58) Field of Search ................................. 356/508, 490, 356/492, 154, 138, 150, 139.1, 139.04; 33/292, 286

(56) References Cited

PUBLICATIONS

M. Francon. "Optical Interferometry", 1966, Academic Press, pp. 87–91.*

* cited by examiner

Primary Examiner—Samuel A. Turner
Assistant Examiner—Patrick Connolly
(74) Attorney, Agent, or Firm—Joseph G. Nauman

(57) ABSTRACT

A method and an instrument are provided for checking and adjusting the accuracy of an alignment device which transmits a collimated (e.g. laser) light beam that serves as an alignment reference. That beam generator defines a precise reference for purposes of alignment of various other forms of apparatus, often over great distance. The checking and adjusting instrument (which is totally passive) provided by this invention is precisely attached to the alignment device, temporarily, and receives the reference beam of light from the device. The instrument displays an indication of misalignment of the beam, and also aids in correcting same.

5 Claims, 2 Drawing Sheets

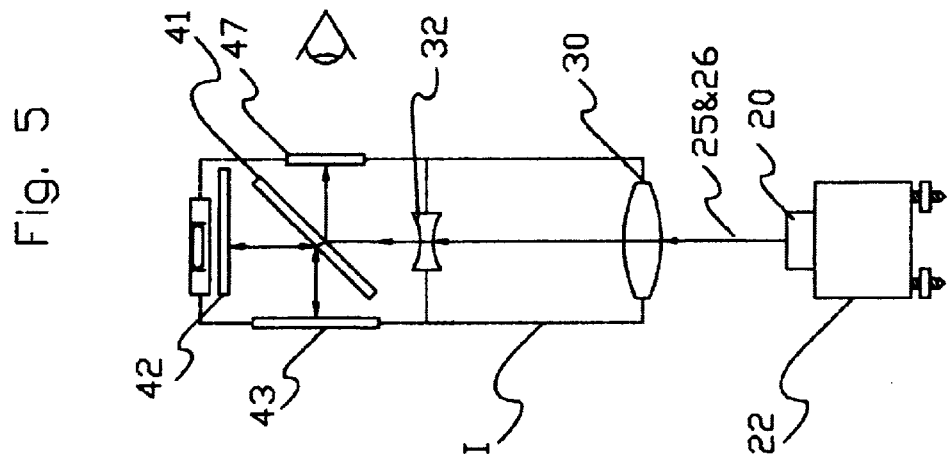
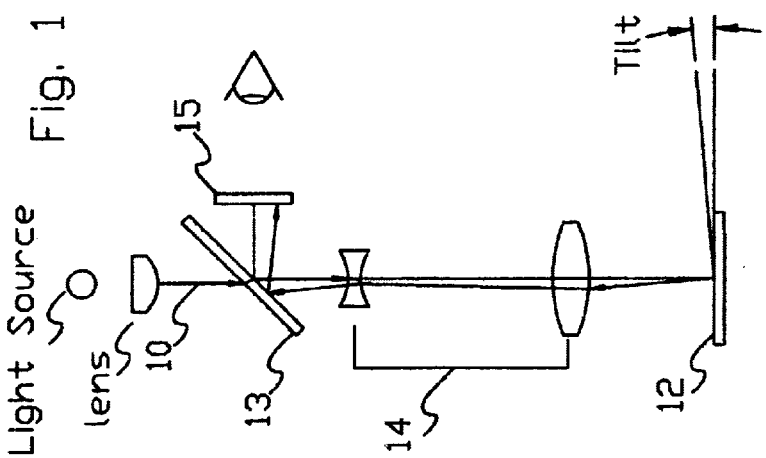
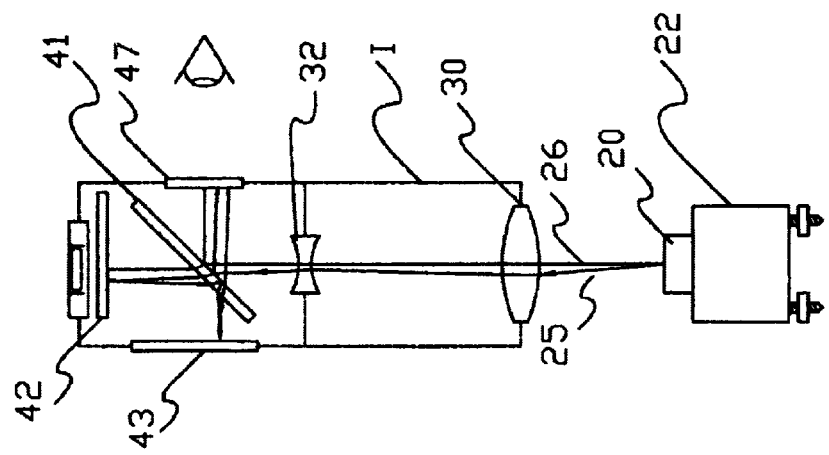

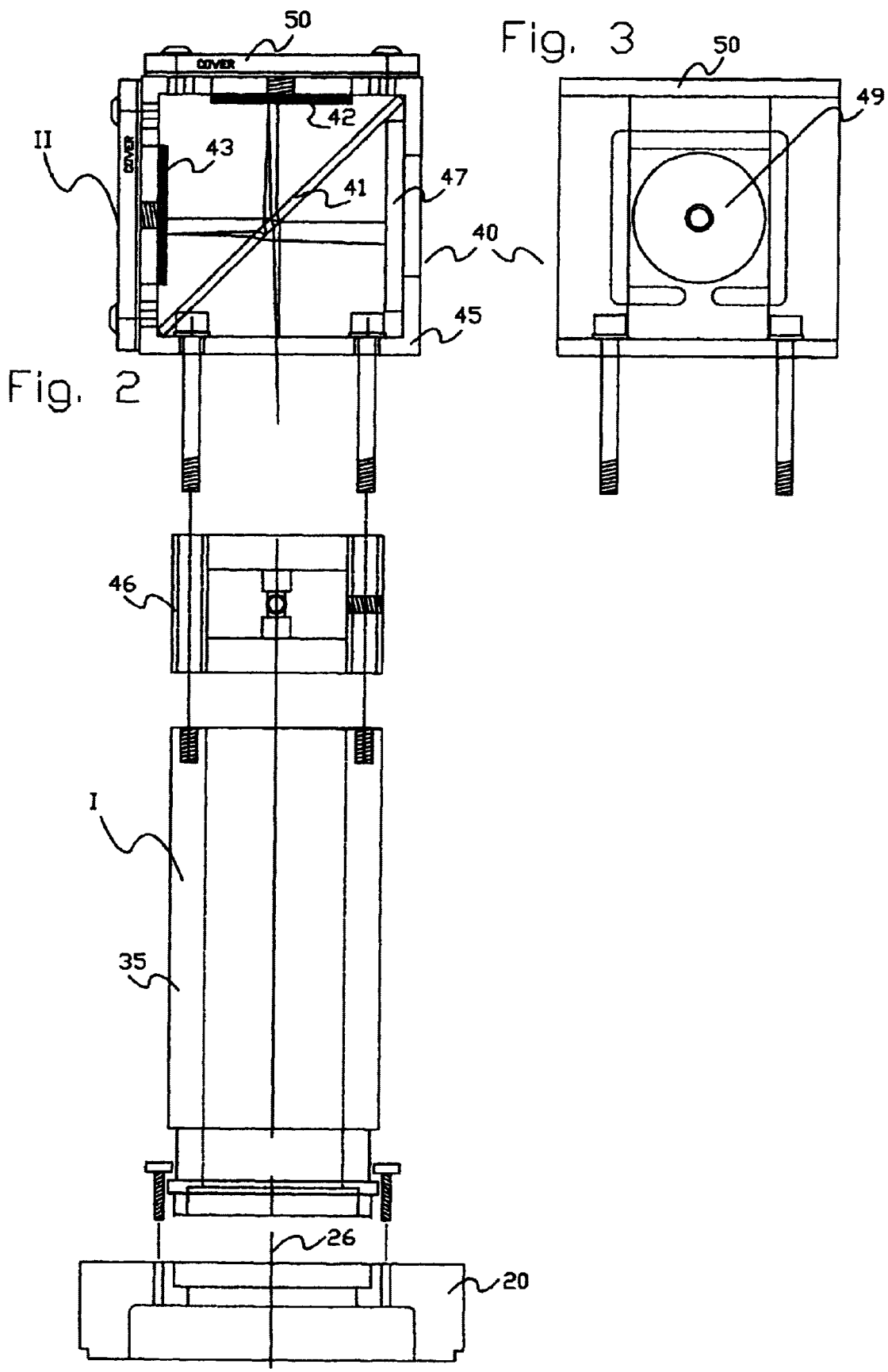

OPTICAL ANGLE FINDER AND COAXIAL ALIGNMENT DEVICE

This application claims benefit of Provisional App Ser. No. 60/118,061, filed Feb. 1, 1999.

FIELD OF INVENTION

Various optical devices have been designed to align one optical system with another. An autocollimator is one such device.

BACKGROUND OF THE INVENTION

The autocollimator, as shown in FIG. 1 (Prior Art), projects a highly collimated beam of light 10 at the optical device 12 to be aligned with respect to the autocollimator. The device 12 to be aligned is made to reflect light back towards the autocollimator and light from the beam source also is reflected directly to a view screen through beam splitter 13, each producing light spots on the view screen 15. The light reflected back will be deviated from the transmitted beam by twice the angle of misalignment (tilt). The light directed to the device 12, and reflected back into the autocollimator, travels through the telescope optics 14, e.g. the eyepiece and objective lenses, and is reflected by beam splitter 13 to the eyepiece or view screen 15. This means that an image of the received light appears as a spot.

Most autocollimators are designed in such a way as to show the incoming light as a spot on a reticle, the reticle having markings that indicate angular displacement. Furthermore, autocollimators are generally designed with costly very high precision diffraction limited optical elements. This is important because the autocollimator serves as a precision collimator to produce a highly parallel transmitted beam that can propagate as far as diffraction will allow. This enables the user to align devices separated by great distances. An example of such an autocollimator in the patent art is found in U.S. Pat. No. 3,836,258.

SUMMARY OF THE INVENTION

The purpose, of this invention (herein called an "angle finder") is to develop a relatively simple instrument for aligning a device or devices which transmit (or use) as an alignment feature a collimated (e.g. laser) light beam. Such a device is equipped or includes an adjustable light transmitter such as a laser beam generator, and for purposes of alignment has the instrument of this invention, which is a totally passive instrument, attached to it. This instrument acts as a receiver of the beam of light and displays an indication of misalignment of the beam, and also aids in correcting same.

BRIEF DESCRIPTION OF THE DRAWINGS

FIG. 1 (Prior Art) is a schematic view of an autocollimator;

FIG. 2 is a side view of an angle finder/alignment apparatus incorporating the features of the invention;

FIG. 3 is a view of the top of FIG. 2;

FIG. 4 is a schematic view of the apparatus showing an "out of alignment" condition; and FIG. 5 is a view similar to FIG. 4 showing a condition of alignment.

DESCRIPTION OF THE PREFERRED EMBODIMENT

There are at least two methods of using the invention: Method 1 involves the angular alignment of a light transmitter to the angle finder; Method 2 involves alignment of the angle finder with a light transmitter.

A typical physical embodiment of the angle finder is illustrated in FIG. 2, comprising a reference mount 20 on an optical instrument (not shown) to which a laser light source 22 is precisely affixed, directing a collimated light beam 25 along an optical axis 26. It is desired to align this beam precisely, and thus secure proper alignment of the instrument. FIG. 4 illustrates the beam misaligned, and in FIG. 5 the beam, and thus the instrument, is properly aligned.

The angle finder can be separated essentially into two functional parts. The first part I is a telescope, of either Gallilean or Keplerian type, used to increase the sensitivity of the second part by magnifying the angle that the input beam deviates from the optical axis (axis of alignment). The telescope comprises a pair of lenses 30, 32 which are supported within a tubular housing 35.

The second part II is a beam splitting and re-directing device 40 comprising at least three optical elements, namely a beam splitter 41 and a pair of first surface mirrors 42, 43, all supported in a second housing 45 that is centered and angularly aligned (so its optical elements will be on-axis) with the telescope housing 35 during manufacture. Collar 46, which may be part of the telescope, is fastened to housing 35 and becomes part thereof. This beam splitting device separates the beam 26 into at least two paths which are then reflected, respectively, by mirrors 42 and 43 and imaged adjacent each other onto a view screen 47.

It should be noted that this view screen 47 can be a simple diffusing screen and contrast enhancement filter, for direct perception, or can be a photo receptor device such as a multi-element photodiode, or a CCD camera or the like, in order to enable the determination of the position and relationship of the images.

At the top of housing 45 there is a high precision omni-directional (e.g. bulls eye) bubble level 50, mounted such that it is level (bubble centered) when the optical axis 26 of the apparatus is true vertical.

Considering the angle finder in a typical practical use, namely the alignment of a laser beam output from a scanning beam generator, the telescope housing 35 is attached to the reference mount 20 of the generator and the transmitted laser beam 25 from the laser beam source in that generator enters the angle finder on or nearly aligned along the optical axis 26 (the axis to be aligned to). The light exits the telescope part I with a beam diameter equal to the product of the input beam diameter, and the inverse of the lateral magnification of the telescope, and with a beam divergence equal to the angular magnification and the product of the input beam divergence. This is noted since it affects the relative spot sizes on the viewing screen. If the beam 25 is misaligned from the optical axis, as in FIG. 5, the beam will exit the telescope part I, with an increased angle relative to the optical axis 26 that is equal to the angular magnification of the telescope. For example, if the magnification of the telescope is 10× and the input beam is off-axis by one milliradian, then the beam output from the telescope will have an angle of ten milliradian from the optical axis. Since in the example shown in FIG. 4 the input beam is exactly aligned along the optical axis, the exit beam will also be aligned along the optical axis. This is ensured by the careful alignment of the telescope optics during manufacture.

This beam now enters the beam splitting part II of the apparatus and impinges on beam splitter 41 which is supported at a predetermined angle, preferably forty-five degrees, with respect to the optical axis. The beam is reflected as first light towards view screen (or to a multi-element photodiode array or a CCD camera or the like). Some of the light passes through the beam splitter as second light and is reflected back towards the beam splitter by the first mirror 42. Some of this second light passes through the beam splitter 41 and back towards the input beam. The remainder of the second light is reflected towards a second mirror 43.

This second light is reflected from second mirror 43 and is redirected back toward the beamsplitter perpendicular to the optical axis of the telescope (part I). Then as a consequence of the alignment of the optics the first light will produce an image (spot S1) on the center of the viewing screen.

The third light will also produce a spot S2 on the viewing screen. It will have a larger diameter because of the divergence of the beam and its longer optical path. The spot from third light will also be reduced in apparent brightness relative to the spot from first light because of light lost from the multiple passes through the beam splitter and since the energy is spread over a larger area on the view screen.

Considering the situation illustrated in FIG. 4, where the input beam is not aligned along the optical axis, and for convenience choosing an example where an input beam of 1 cm. diameter and 1 milliradian divergence enters the telescope at some angle (e.g. 1 milliradian), if the telescope has a 10× magnification, then the output beam of the telescope exits with a beam diameter of 0.1 cm. and 10 milliradian divergence, and at an angle from the optical axis of 10 milliradian.

Furthermore, choosing the distance from the telescope to the beam splitter along the optical axis to be 5 cm. and the distance from the beam splitter along the optical axis to either mirror or to the viewing screen to also be 5 cm., by simple geometry it is seen that the first light produces a 0.3 cm. diameter image on the viewing screen that is displaced laterally from the optical axis at the view screen by 0.1 cm. For the third light, by applying the law of reflection at each of the mirrors, it will be seen that the displacement will be in the same direction as the beam from first light but displaced laterally by 0.3 cm. from the optical axis and with image spot size of 0.3 cm. The difference in displacements is 0.2 cm. Thus, the separation of the images is proportional to changes in angular alignment.

To align the instrument (e.g. the scanning generator) with the attached angle finder, the two are adjusted as a unit until the bubble level 50 is centered. This places the angle finder housings in plumb with respect to the ground surface. Then, the laser beam source within the generator is adjusted until the spot images are coincident on the view screen, and this places the generator output beam on plumb.

Furthermore, if the incoming beam is at some arbitrary angle (as in FIG. 4) to the optical axis 26, and if the angle finder is moved laterally with respect to its optical axis, it will be seen that the images maintain their separation on the view screen and are merely displaced together in a direction on the view screen corresponding to the direction of lateral displacement of the angle finder. Therefore it can be said that the device is insensitive or invariant to changes in lateral position of the novel angle finder with respect to the incoming beam. This is a complement of laser targets as disclosed in U.S. Pat. No. 5,710,647 and 5,760,932, issued to the same assignee as this application, where the devices are sensitive to lateral displacement and invariant to changes in input beam angle.

Thus, it should be noted that one can incorporate the position sensing features of the laser target and the angle aligning features of the angle finder of the present invention into one unit useful as a "universal laser target" that would simultaneously allow the positioning of the target on the beam centerline and the coaxial alignment of the target to the input beam.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. An optical alignment instrument comprising
   a telescope section having a housing and having therein lens means arranged to receive an input beam from a device to be tested for alignment of an adjustable beam generating mechanism in such device,
   said telescope housing being adapted for fixation at one of its ends to the device and defining an optical axis,
   a beam splitting and beam directing means affixed to the other end of said telescope housing and including a beam splitter therein positioned at a predetermined angle to said optical axis, said beam splitter being constructed and arranged to refract the input beam exiting said telescope into first and second reference beams,
   a first mirror receiving a first refracted beam from said beam splitter and redirecting said first reference beam through said beam splitter along an output axis,
   a second mirror receiving said second reference beam from said beam splitter and redirecting said second reference beam through said beam splitter also along said output axis,
   a view screen receiving said reflected reference beams along said output axis and functioning to form images from said first and second reference beams,
   whereby coincidence of the two images indicates alignment of the input beam on the optical axis of the instrument and spacing of the two images indicates the amount and direction of misalignment.

2. An instrument as defined in claim 1, further including a level indicating device attached to said instrument to display the plumb/out-of-plumb orientation of the alignment instrument and of the beam source of the device being aligned.

3. The method of securing and correcting the alignment of a collimated reference beam emanating from an alignment device, comprising
   a) attaching an alignment instrument to the device in a fixed predetermined reference position so as to receive the collimated beam therefrom,
   b) directing said input beam through a telescope and onto a beam splitter which is adapted to refract the beam into first and second reference beams,
   c) redirecting the reference beams back through the beam splitter along an output axis to a view screen where images of the two reference beams can be observed,
   whereby coincidence of the two images indicates an aligned condition and spacing of the two images will indicate the amount and direction of misalignment.

4. An optical alignment instrument as defined in claim 2, wherein the level indicating device is an omnidirectional bubble level fixed to said telescope housing so as to indicate when the optical axis is true vertical.

5. An optical alignment instrument as defined in claim 1, wherein the a removable collar is precisely attached to said telescope housing, said collar being adapted to connect precisely to an instrument to be aligned to provide an aligned mounting for the instrument.

\* \* \* \* \*